United States Patent
Hansa et al.

(10) Patent No.: US 7,063,866 B2
(45) Date of Patent: *Jun. 20, 2006

(54) COATED OAT PRODUCT

(75) Inventors: James Hansa, Algonquin, IL (US);
Alice Hibbs, Crystal Lake, IL (US);
Kent Salisbury, Barrington, IL (US)

(73) Assignee: The Quaker Oats Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/935,676

(22) Filed: Sep. 7, 2004

(65) Prior Publication Data

US 2005/0031739 A1    Feb. 10, 2005

Related U.S. Application Data

(60) Continuation of application No. 10/272,804, filed on Oct. 17, 2002, now abandoned, which is a continuation of application No. 09/737,906, filed on Dec. 15, 2000, now Pat. No. 6,472,004, which is a division of application No. 09/487,036, filed on Jan. 19, 2000, now Pat. No. 6,685,976.

(51) Int. Cl.
*A23L 1/09* (2006.01)
*A23L 1/164* (2006.01)

(52) U.S. Cl. .................. 426/96; 426/620; 426/621; 426/457

(58) Field of Classification Search ............... 426/96, 426/620, 621, 457
See application file for complete search history.

(56) References Cited

U.S. PATENT DOCUMENTS

| | | | |
|---|---|---|---|
| 1,159,045 A | 11/1915 | Kellogg |
| 2,998,317 A | 8/1961 | Reesman |
| 3,318,705 A | 5/1967 | Clausi et al. |
| 4,097,613 A | 6/1978 | DeLauder et al. |
| 4,413,018 A | 11/1983 | Webster |
| 4,501,759 A | 2/1985 | Gajewski |
| 4,702,925 A | 10/1987 | Verrico |
| 4,767,631 A | 8/1988 | Calandro et al. |
| 4,963,373 A | 10/1990 | Fan et al. |
| 5,156,870 A | 10/1992 | Evans |
| 5,368,870 A | 11/1994 | Efstathiou |
| 5,523,109 A | 6/1996 | Hellweg et al. |
| 5,709,902 A | 1/1998 | Bartolomei et al. |
| 5,776,534 A | 7/1998 | Christensen et al. |
| 5,894,027 A | 4/1999 | Kazemzadeh |
| 5,919,503 A | 7/1999 | Leusner |
| 6,174,553 B1 | 1/2001 | Cerda et al. |
| 6,291,008 B1 | 9/2001 | Robie et al. |

FOREIGN PATENT DOCUMENTS

EP    0 586 138 A2    9/1994

*Primary Examiner*—Helen Pratt
(74) *Attorney, Agent, or Firm*—Lars S. Johnson; James D. Ryndak

(57) ABSTRACT

A coated, uncooked oat product is provided that has no added fat and comprises uncooked oat flakes having a coating adherent to the oat flakes. A coated, oat flake agglomerate is also provided, wherein each agglomerate comprises at least two uncooked oat flakes and has a fat-free coating. A flavored, coated oat product in bulk and a flavored, coated, agglomerated oat product are provided, both of which products have flavors uniformly distributed throughout the bulk. Corn grit products are also provided and include (1) individual pieces of corn grit having a fat-free coating and (2) clusters of corn grit pieces having a fat-free coating.

11 Claims, 3 Drawing Sheets

COATED OAT PRODUCT

CROSS REFERENCE TO RELATED APPLICATION

This is a continuation of U.S. patent application Ser. No. 10/272,804, filed Oct. 17, 2002, which has been abandoned and which is a continuation of U.S. patent application Ser. No. 09/737,906, filed Dec. 15, 2000, now U.S. Pat. No. 6,472,004, which is a divisional of U.S. patent application Ser. No. 09/487,036, filed Jan. 19, 2000, now U.S. Pat. No. 6,685,976.

FIELD OF THE INVENTION

This invention relates to coated, uncooked, flaked oat products and methods of making such oat products. More particularly, the present invention relates to (1) an oat product comprising coated, uncooked oat flakes and having a fat-free coating adhered to the oat flakes, (2) an agglomerated oat product comprising coated, uncooked oat flakes and having a fat-free coating adhered thereto, (3) a flavored oat product in bulk comprising oat flakes coated with a fat-free coating, and (4) a flavored oat product in bulk comprising oat flake agglomerates having a fat-free coating.

This invention also relates, in particular, to methods of making the coated, uncooked oat flake product; the agglomerated, coated oat flake product; and the coating.

BACKGROUND OF THE INVENTION

Cereal manufacturers today are faced with the ever-increasing challenge of producing flavorful yet nutritious products that appeal to consumers. Nutritionally, compared with other grains, oats offer a high concentration of protein, a good distribution of amino acids, and fiber. Oat groats—the component of oats that is used to form oat flakes (also termed "flaked oats" herein)—reportedly have a high protein concentration in the range of about 13.8% to 25.5%. See Oat, Ch. 10 by V. L. Young and R. A. Forsberg, in "Nutritional Quality of Cereal Grains: Genetic and Agronomic Improvement," pp. 466–475, published by the American Society of Agronomy, Inc., Madison, Wis. (1987). Moreover, the amino acid composition of oat protein is good compared to other grains. Although lysine is the major limiting amino acid in oats, oats still have a higher concentration of this amino acid than is typically found in other grains. Further, rolled oat groats are a good fiber source as they contain about 1.1% crude fiber and thus provide 0.3 grams of crude fiber per ounce of rolled oat groats.

Various oat-based products—namely, granola—have been produced which take advantage of the high nutritional profile of the oat grain. However, because these products are produced via a baking process, they tend to have a relatively hard texture. For that reason, granola-based products are formulated to contain at least about 3 to 7 grams of fat per about 55 grams of finished product, wherein the fat imparts a tender texture to the product. Further, in the packaged granola product, the coating material tends to chip or fall off the baked granola product and settle at the bottom of the package. As a result, it is virtually impossible to obtain a uniform, bulk-packaged, oat-based granola product.

Thus, there exists a need for an uncooked oat product comprising oat flakes and having a coating adhered to the oat product which contributes no added fat to the finished oat product. There also exists a need for an agglomerated oat product comprising agglomerated, uncooked oat flakes having a fat-free coating adhered to the uncooked oat flakes. Further, there exists a need for methods for making both of the aforedescribed, inventive oat products.

SUMMARY OF THE INVENTION

In accordance with one aspect of the present invention, a coated, uncooked oat product is provided that has no added fat and comprises uncooked oat flakes having a coating adhering to the surface of the oat flakes. The coating comprises at least one material selected from the group consisting of colorants, flavors, nutrients, and sweeteners. Typically, the coating comprises from about 0.1% to about 60% by weight, on a dry weight basis of the uncooked oat product. On a dry weight basis, the concentration of the coating is preferably in the range of from about 5% or 20% to about 50% by weight of the uncooked oat product and most preferably, in the range of from about 35% to about 45% by weight, on a dry weight basis of the uncooked oat product.

In accordance with another aspect of the present invention, an uncooked oat product is provided comprising a coated, oat flake agglomerate, wherein each agglomerate comprises at least two uncooked oat flakes and has a fat-free coating, as described above. In such product, the coating comprises from about 20% to about 60% by weight, on a dry weight basis of the oat flake agglomerate. Preferably, on a dry weight basis, the coating accounts for about 35% to about 45% by weight of the oat flake agglomerate.

In accordance with still another aspect of the present invention, a corn grit product is provided comprising individual pieces of corn grit coated with the aforedescribed material which contains no added fat. The grits are unflaked and may be either cooked, partially cooked, or uncooked. Additionally, the coated corn grits may be clustered to form coated clusters of corn grits in accordance with the invention. The resulting products may be used as hot cereals.

In accordance with still another aspect of the present invention, a method of coating uncooked oat flakes with a desired fat-free coating is provided. The method involves feeding uncooked oat flakes into a circulating drum, coating the oat flakes by spraying the oat flakes with a stream of coating material, drying the coated oat flakes until the oat flakes have attained the desired moisture content, and cooling the coated oat flakes. The method is additionally applicable to coating individual pieces of cooked or partially cooked corn grits.

In accordance with still another aspect of the present invention, a method of forming coated, uncooked oat flake agglomerates is provided. This method involves essentially the same steps as the aforedescribed method for coating uncooked oat flakes. However, in the coating step of this method, the coating material sprayed onto the oat flakes comprises a binder material that allows the oat flakes to form agglomerates of a plurality which may be two, three, four or more flakes and typically less than about 20 or 40 flakes. The method can also be used to form clusters of cooked or partially cooked corn grits.

Still another aspect of the invention relates to a method for preparing the desired coating material in solution and/or dispersion form which comprises mixing together at least one component selected from the group consisting of colorants, flavors, nutrients, and sweeteners with water to form a coating mixture; and optionally heating the coating mixture to elevated temperature, which can be about 140° F., for example, to dissolve and/or disperse the components of the mixture and form the coating material.

In accordance with still another aspect of the invention, a flavored oat product in bulk is provided, wherein the oat product in bulk comprises uncooked oat flakes individually coated with a fat-free coating that is substantially uniform in its distribution throughout the product. Alternatively, the coating can contain fat, if desired. Also in accordance with the invention is a flavored oat product in bulk comprising uncooked oat flake agglomerates of at least two oat flakes having a fat-free coating. The coating on these two bulk products includes at least one material selected from the group consisting of colorants, flavors, nutrients, and sweeteners and is uniformly distributed throughout the oat product in bulk. The substantially uniform distribution of the coating ensures a consistent bulk-packaged product.

Thus, the inventive coated oat flake product, the coated oat flake agglomerated product, the flavored oat product in bulk, the flavored, agglomerated oat product in bulk, and the methods for making such products address the need for a grain product that utilizes the high protein content of oats, contains no added fat, no significant amount of added fat, or added fat as desired and provides consistent product quality as the product coating does not chip or fall off the oat product, and exhibits good adherence to the uncooked grain or oat flake.

Products in accordance with the invention can be utilized as a hot cereal (with added milk or water and heat), a ready-to-eat cereal (with the addition of milk) or a snack (i.e., consumed directly from the container without further preparation).

Other advantages and features of the invention will become apparent from the following description and from reference to the drawings.

DETAILED DESCRIPTION OF THE INVENTION

Figure 1:
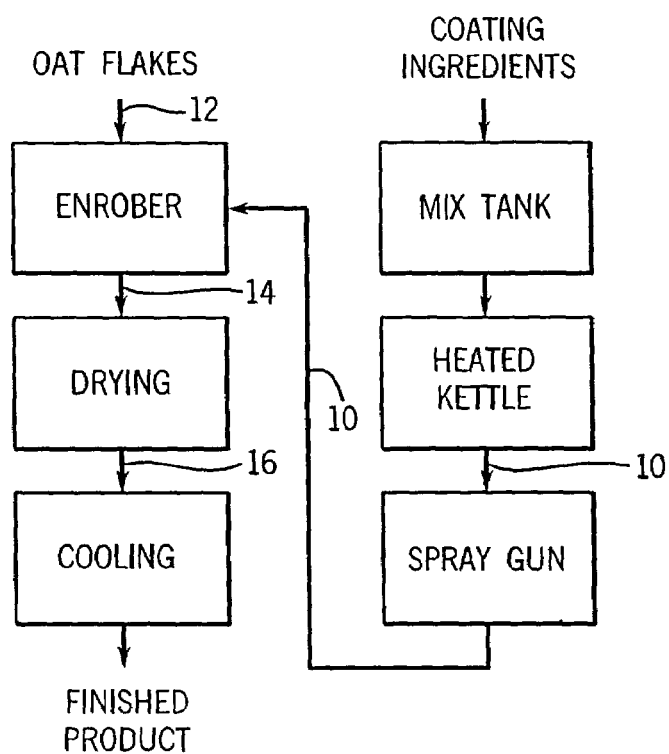
FIG. 1 is a flow chart illustrating a method of coating oat flakes with a fat-free coating material in accordance with the invention.

This invention includes all alternatives, modifications, and equivalents that may be encompassed within the spirit and scope of the invention, as defined by the appended claims. The invention is not limited to the embodiments described herein. In accordance with the invention, any source of oat flakes can be used and any suitable process can be used to make oat flakes or flaked oats. It is also to be understood that in accordance with the invention, any suitable cooking or partial cooking technique can be used to make corn grits. Corn grits can be obtained from corn in any manner known to those skilled in the art and in any desired size range. Throughout the following description, like numerals and letters refer to like parts or steps.

In accordance with the present invention, an uncooked oat product is provided which comprises uncooked, individual oat flakes having a coating that imparts no added fat to the finished product. The coating comprises at least one material selected from the group consisting of colorants, flavors, nutrients, and sweeteners. The coating, applied so it is substantially uniformly distributed over the surface of the oat product, preferably comprises from about 0.1% to about 60% by weight, on a dry weight basis of the uncooked oat product. More preferably, the coating comprises from about 20% to about 50% by weight, on a dry weight basis, of the uncooked oat product. Most preferably, the coating comprises from about 35% to about 45% by weight, on a dry weight basis of the uncooked oat product. Preferably, the aforedescribed inventive product is packaged in a bulk quantity.

Vitamins, minerals, natural nutrients and sweeteners may be added to the coating material if desired. Typically, vitamins are selected from the group consisting of, for example, vitamin A, beta-carotene, thiamin, riboflavin, niacin, vitamin $B_6$, vitamin $B_{12}$, vitamin C, vitamin D, vitamin E, folic acid, and derivatives and mixtures thereof. Minerals are generally selected from the group consisting of, for example, calcium, copper, iron, magnesium, manganese, molybdenum, phosphorus, potassium, selenium, zinc, and derivatives and mixtures thereof. Natural nutrients are selected from the group consisting of, for example, Echinacea extract, gingko biloba extract, ginseng, bee pollen, St. John's wort extract, and mixtures thereof. Sweeteners are generally selected from the group consisting of, for example, sugar, fructose, honey, corn syrup, molasses, fruit juice, artificial sweeteners, and mixtures thereof.

In accordance with another aspect of the invention, the aforedescribed inventive oat product is provided wherein the oat product comprises a mixture of a plurality of coated oat flakes being of a first color and a plurality of other coated oat flakes being of a second color, distinct from the first color. The colors are provided by water-soluble colorants present in the coating on the oat flakes. When the oat product is placed in contact with an aqueous medium, such as milk or water, the colorants in the coatings of the different colored oat flakes become dissolved or dispersed and commingle in the aqueous medium to form a new color in the aqueous medium, distinct from either the first or second colors. Thus, pursuant to this embodiment, the flaked oat product forms a third, new color (i.e., green) where the first color is, for example, yellow and the second, blue; (i.e., orange) where the first color is red and the second, yellow; or (i.e., purple) where the first color is red and the second, blue, for example.

In accordance with another aspect of the invention, an uncooked oat product is provided which comprises agglomerated, uncooked, flaked oats having a coating that is applied over the surface of the flaked oats and that contributes no added fat and remains adhered to the individual flaked oats. Typically, each agglomerate comprises at least two uncooked oat flakes. The agglomerates range in size: "small" agglomerates have from two to ten flakes and more typically from five to ten flakes, whereas "large" agglomerates generally comprise more than ten oat flakes and, more typically, from 20 to more than 40 oat flakes.

Typically, the coating applied to the oat flake agglomerates comprises at least one material selected from the group consisting of colorants, flavors, nutrients, and sweeteners, which are the same constituents used in the coating that is applied to the coated, uncooked oat flakes previously described. In addition, the coating comprises a binding material selected from the group consisting of sugar, fructose, honey, corn syrup, molasses, fruit juice, hydrocolloids, maltodextrin, corn syrup solids, and mixtures thereof, for example. The nutrients included in the coating of the agglomerated oat product generally are compounds selected from the group consisting of vitamins, minerals, natural nutrients, and mixtures thereof, as previously described.

On a dry weight basis, the coating preferably accounts for from about 20% to about 60% by weight of the oat flake agglomerate and most preferably from about 35% to about 45% by weight of the oat flake agglomerate. Preferably, the agglomerated oat flake product is packaged in a bulk quantity.

In another embodiment of the present invention, the agglomerated, uncooked, flaked oat product comprises a mixture of a plurality of colored, coated oat flakes of a first color and a plurality of colored, coated oat flakes of a second color. As described above for the non-agglomerated oat product, the colors are produced by water-soluble colorants present in the coating, which coatings are preferably applied in a substantially uniform manner over the surface of the oat flakes. When the agglomerated, uncooked, flaked oat product is placed in an aqueous liquid, such as milk or water as examples, and the colorants become hydrated, the combination of the colorants forms a new color, distinct from the first and second colors. For example, a new color is produced when the first color is yellow and the second, blue; when the first color is red and the second, yellow; or when the first color is red and the second, blue.

In yet another aspect of the invention, the uncooked, flaked oat product comprises a mixture of a plurality of colored, coated oat flakes of a first color and a plurality of colored, coated oat flakes of a second color. As described above for the non-agglomerated oat product, the colors are produced by water-soluble colorants present in the coating, which coatings are preferably applied in a substantially uniform manner over the surface of the oat flakes. When the agglomerated, uncooked, flaked oat product is placed in an aqueous liquid, such as milk or water as examples, and the colorants become hydrated, the combination of the colorants forms a new color, distinct from the first and second colors. For example, a new color is produced when the first color is yellow and the second, blue; when the first color is red and the second, yellow; or when the first color is red and the second, blue.

Also in accordance with the invention, an unflaked corn grit product is provided wherein individual pieces of corn grit are coated with the aforedescribed coating material. In the inventive product, the coating typically will comprise from about 0.1% to about 40% by weight on a dry weight basis of the coated corn grit. Typically, after isolating from corn the grits to be processed in accordance with the invention, the grits are cooked, partially cooked, or uncooked. Generally, cooked or partially cooked grits would be heated and cooked prior to consumption. One known technique for cooking grits is to hydrate the grits with water and steam. Thereafter, the grits can be dried; for example, by a drum-drying step or any other suitable means known to those skilled in the art. After the grits are cooked, the cooked grits can be coated in accordance with the invention and packaged until the time of their intended use. Although not necessary, the uncooked, coated grits would be cooked prior to consumption.

Another aspect of the invention is a cluster of corn grit pieces coated with the aforedescribed coating material. In each corn grit cluster, the coating typically will comprise from about 0.1% to about 40% by weight on a dry weight basis of the corn grit cluster. Typically, the coated corn grit clusters comprise at least two individual pieces of corn grit and, more typically, from about 3 to about 20, 50, or 100 or more pieces of corn grit.

In another embodiment, both inventive corn grit products—i.e., the individually coated corn grit product and the corn grit cluster product—each comprise a mixture of a plurality of coated corn grit pieces of a first color present in the coating and a plurality of other coated corn grit pieces of a second color. As described above, the colors are produced by water-soluble colorants present in the coating. When the mixture of coated corn grits is placed in an aqueous medium such as milk or water, as examples, the colors combine to form a new, third color in the aqueous medium.

In another embodiment of the invention, a method is provided for preparing the fat-free coating material for application onto either individual uncooked oat flakes or single corn grits, comprising (i) mixing at least one component selected from the group consisting of colorants, flavors, nutrients, and sweeteners with water to form a coating mixture; and (ii) optionally heating the coating mixture at an elevated temperature, for example, from about 100° to 160° F., and preferably to about 140° F., to dissolve or disperse the components of the coating mixture and form the coating material.

Also in accordance with the invention is a similar method of preparing a coating material for application onto either oat flake agglomerates or corn grit clusters. This method generally comprises: (i) mixing a binding material with water and at least one component selected from the group consisting of colorants, flavors, nutrients, and sweeteners with water to form a coating mixture; and (ii) optionally heating the coating mixture to elevated temperature sufficient to dissolve or disperse the components of said coating mixture and form said coating material.

In FIG. 1, a flow chart illustrates the steps involved in a method of coating uncooked, flaked oats with a desired, fat-free coating material in accordance with the present invention. The method comprises: (i) feeding uncooked oat flakes; shown as stream 12, into a rotating drum; (ii) coating the oat flakes by spraying the oat flakes with a stream of the coating material, shown as stream 10, until the coating material is applied over the surface of the oat flakes in a substantially uniform manner; (iii) drying the coated oat flakes, shown as stream 14, until the coated oat flakes attain a desired percentage of moisture; and (iv) cooling the dried, coated, uncooked oat flakes, shown as stream 16, if processed at an elevated temperature. The method also has application for coating individual pieces of corn grit with a fat-free coating.

Typically, the coating and drying steps can be achieved by any suitable means known to those skilled in the art; for example, coating can be achieved by an enrober or rotating drum, and drying, by a continuous belt dryer or a fluidized bed, forced air dryer. Because such devices are well known to those skilled in the art, a detailed disclosure of such equipment is not provided. Generally, the coated oat flakes are dried at a temperature in the range of from about 100° F. to about 500° F. and more typically 150–350° F. and preferably to a moisture content of from about 3–14% and more typically 4–12%, on a dry weight basis. The coated corn grits are dried at a temperature in the range of from about 100° F. to about 500° F. and to a moisture content of about 1–14% and more typically about 5–7%, on a dry weight basis. The coating and drying steps preferably take place simultaneously.

This method efficiently distributes the coating in a substantially uniform manner over the surface of the flaked oats or corn grits so that the coating adheres to the surface of the uncooked, flaked oats or corn grits and does not readily chip or fall off the product. The resulting product is thus ideally suited for bulk packaging since the coating material will not separate into a separate phase or settle to the bottom of a container.

In accordance with the present invention, typically the coating material is applied to the uncooked oat flakes at a concentration of from about 0.1% to about 60%, on a dry weight basis by weight of the coated oat flakes. Preferably, on a dry weight basis, the coating material is applied to a concentration of from about 35% to about 50% of the weight of the coated oat flakes. Preferably, with respect to corn grits, the coating is applied, on a dry weight basis, to a concentration of from about 5% to about 40% by weight of the coated corn grits.

Another aspect of the present invention is a method of forming coated, uncooked oat flake agglomerates that have no added fat. The method comprises: (i) feeding uncooked oat flakes into a rotating drum; (ii) coating the surface of the oat flakes by spraying the oat flakes with a stream of a coating material comprising a binding material until the oat flakes form agglomerates, each oat flake agglomerate comprising at least two flakes; (iii) drying the oat flake agglomerates to a desired percentage of moisture; and (iv) cooling the coated, oat flake agglomerates if processed at an elevated temperature. Typically, the coating material is applied at a concentration of from about 20% to more than 60%, on a dry weight basis by weight of the coated oat flake agglomerates. This method is also applicable to the formation of clusters of coated corn grit, wherein the concentration of the coating material is, on a dry weight basis, about 0.1% to about 40% or more, by weight of the coated corn grit.

The coated oat flake agglomerates typically are dried at a temperature in the range of from about 100° F. to about 500° F. and to a desired moisture level, generally in the range of from about 3% to 14% and more typically from about 4–12% on a dry weight basis. The coated corn grit clusters typically are dried at a temperature in the range of from about 100° F. to about 500° F. and to a desired moisture level, generally in the range of from about 1% to about 14% and more typically about 5–7% on a dry weight basis. Drying may be done by any suitable drying means known to those skilled in the art, including, for example, a continuous belt dryer or a fluidized bed, forced air dryer.

In accordance with the invention, a flavored oat product in bulk is provided, having flavors uniformly distributed throughout the product in bulk. The flavored oat product in bulk comprises uncooked, coated, flaked oats having a coating adhered to the flaked oats, where the coating contributes no added fat, or added fat as desired, and includes at least one flavoring component and at least one material selected from the group consisting of colorants, nutrients, and sweeteners, as these are defined above. Typically, the coating material is present on the flaked oats at a concentration of from about 0.1% to about 60% on a dry weight basis of the flavored oat product. Preferably, on a dry weight basis, the coating material has a concentration of from about 20% to about 50% by weight of the flavored oat product, and most preferably at a concentration of from about 35% to about 45% by weight of the flavored oat product.

Typically, the flavored oat product in bulk comprises a mixture of a plurality of coated oat flakes of a first color and a plurality of other coated oat flakes of a second color, distinct from the first color. The color is provided by water-soluble or dispersible colorants present in the coating of the oat flakes. When the flavored bulk oat product is placed in an aqueous liquid, the colorants dissolve, or disperse, and combine in the liquid to produce a new color in the liquid where the new color is different from the color of the dry oat flakes. For example, the colorant produces a new, third color when the first color is yellow and the second, blue; when the first color is red and the second, yellow; and when the first color is red and the second, blue.

Another embodiment of the present invention features a flavored oat product in bulk comprising agglomerated, coated, uncooked, flaked oats. Each agglomerate comprises at least two uncooked oat flakes. The agglomerates range in size: "small" agglomerates have from two to ten flakes and more typically from five to ten flakes, whereas "large" agglomerates generally comprise more than ten oat flakes and, more typically, from 20 to more than 40 oat flakes. Typically, the agglomerated, flavored oat product in bulk comprises a coating that contributes no added fat to the finished product and that adheres to the uncooked, flaked oats. Preferably, the coating includes at least one material selected from the group consisting of colorants, flavors, nutrients, and sweeteners, as these materials are described above. On a dry weight basis, the coating generally comprises from about 20% to about 60% by weight of the flavored, agglomerated, bulk oat product, and preferably from about 35% to about 45% by weight of such product. The substantially uniform distribution of coating on the flavored bulk oat product ensures a uniform distribution of flavors therethrough.

In accordance with another aspect of this invention, the flavored bulk oat product is a mixture of a plurality of coated oat flake agglomerates of a first color and a plurality of coated oat flake agglomerates of a second color, consistent with the description given above. Water-soluble or dispersible colorants present in the coatings impart the color to the coated oat flake agglomerates. When the flavored bulk oat product is placed in an aqueous liquid, the colorants cause the liquid to develop a new, third color, distinct from the first and second colors. For example, the colorants produce a green color when the first and second colors are yellow and blue; they produce orange when the first and second colors are red and yellow, and purple when the first and second colors are red and blue.

The following are examples of embodiments of the inventive method as it may be used to produce a variety of coated oat flake products or coated corn grit products.

The coating and drying steps utilize equipment that is well known to those skilled in the art. However, examples of particular systems that are suitable include a system that provides simultaneous coating and drying, designated as PSC-020 Batch Coating System, manufactured by Coating Machinery Systems, Inc. of Huxley, Iowa.

The process of the present invention can be operated as a batch or continuous process. To prevent unwanted agglomeration or clumping, the coated oat flakes can be agitated during drying and/or cooling.

EXAMPLE 1

As described below, the inventive method is suited for making a bulk-packaged, colored oat flake product that, when cooked, can be served as oatmeal.

Figure 2A:
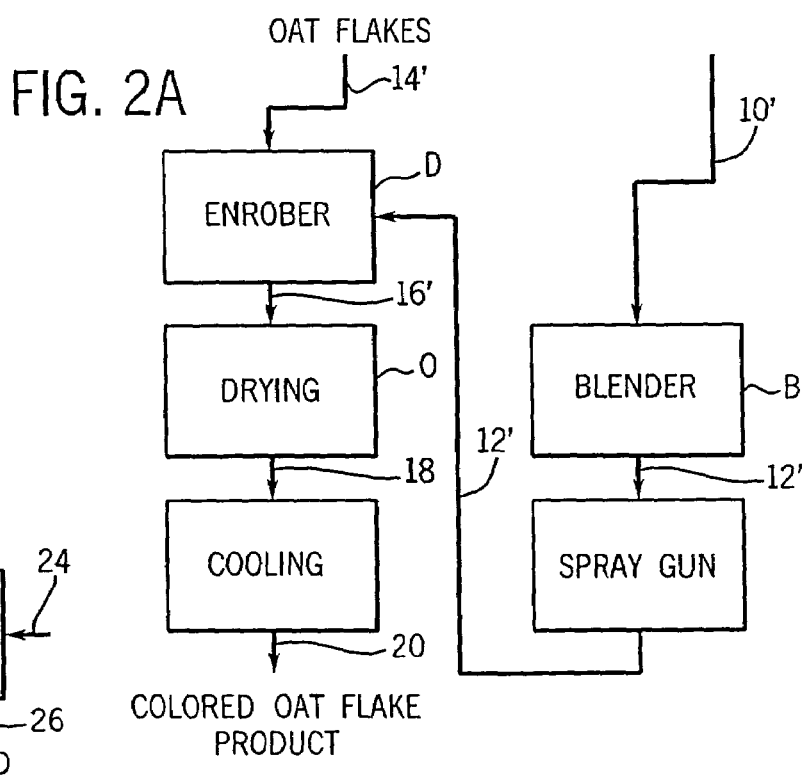
FIGS. 2A and 2B are flow charts illustrating a method of coating oat flakes with colorant-containing coating material in accordance with the invention.

The process, shown in FIG. 2A, commences with feeding stream 14' which can be either a batch or continuous process comprising 1 kilogram of oat flakes into a drum D rotating at a speed of 17 RPM. A coating material, designated as stream 12', is prepared by mixing stream 10' comprising 2.5 grams of, for example, red colorant (or any other colorant) with 250 grams of water in a blender B until thoroughly dispersed or dissolved. Approximately 167–250 grams of coating material, stream 12', is sprayed onto the oat flakes, and drum D is rotated until the coating material is substantially uniformly applied over the surface of the oat flakes. The coated oat flakes, shown as stream 16', can be dried either on a batch or continuous basis. The coated oat flakes are dried in dryer O at 200° F. for about 1.6 minutes, 50% of which time includes exposure to a vertically directed air flow. The coated and dried oat flakes, shown as stream 18, are then cooled to a temperature of less than 110° F. The finished colored oat flake product, shown as stream 20, typically has a moisture concentration in the range of about 9 to 12%.

This method may be used to prepare oat flakes that are of virtually any color, such as red, green, blue, yellow, orange, blue/yellow, multi-colored, and variations thereof, for example.

Figure 2B:
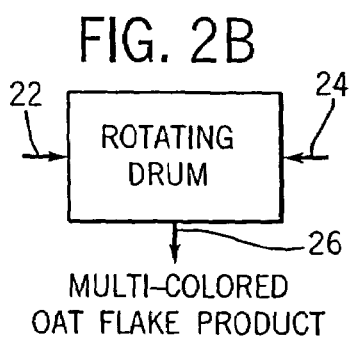

In another embodiment, the inventive method may be used to prepare a multi-colored oat flake product, comprising a mixture of colored oat flakes. Shown in FIG. 2B, this method involves mixing concentrations of oat flakes of a first color, shown as stream 22, with oat flakes of a second color, shown as stream 24, so as to produce a finished product, stream 26, containing a mixture of colored oat flakes in desired concentrations. For example, blue oat flakes and red oat flakes can be mixed together in a concentration of 40:60. This embodiment is not limited to the use of only two colors of oat flakes; alternatively, three, four, five or more colors of oat flakes can be blended together to achieve a finished product with the desired color combination and concentration. Any suitable device, such as a rotating drum, may be used to blend the colored oat flakes to achieve a substantially uniformly mixed product.

Colored oatmeal may be prepared from the colored oat flake product by combining the oat flakes with a desired amount of milk or water and cooking the mixture in a suitable manner.

EXAMPLE 2

Figure 3:
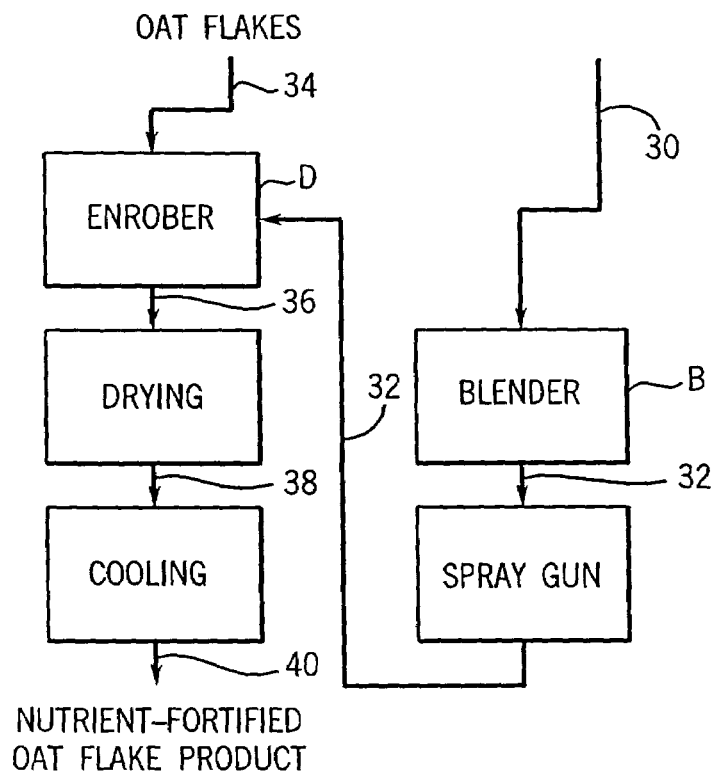
FIG. 3 is a flow chart illustrating a method of coating oat flakes with nutrient-containing coating material in accordance with the invention.

The method of Example 1 may be modified and utilized, as shown in FIG. 3, to form a nutrient-fortified oat flake product. Here, the coating material is prepared by blending 100 grams of water and 0.5 grams of the desired nutrient, shown as stream 30, in a blender B. In this case, the nutrient used is a blend of vitamins $B_6$, $B_{12}$ and folate. The coating material, shown as stream 32, is sprayed onto 1 kilogram of oat flakes, shown as stream 34, as they tumble in a drum D that is rotating at 17 RPM. The tumbling action of the oat flakes helps to uniformly disperse the coating material in a substantially uniform manner across the surface of the oat flakes. Shown as stream 36, the coated oat flakes are then spread to a depth of about 1 to 3 inches and dried at 200° F. for about 2–4 minutes. Approximately 50% of the drying time utilizes a vertically directed air flow. The dried, coated oat flakes, shown as stream 38, are then cooled to a temperature of less than 110° F. The finished, nutrient-fortified oat flake product, stream 40 in FIG. 3, has a moisture concentration of about 10% to 13%.

This method may be used to fortify oat flake products with vitamin B derivatives such as vitamins $B_6$ and $B_{12}$, as well as ginseng, Echinacea extract, and gingko biloba extract, for example.

EXAMPLE 3

Figure 4:
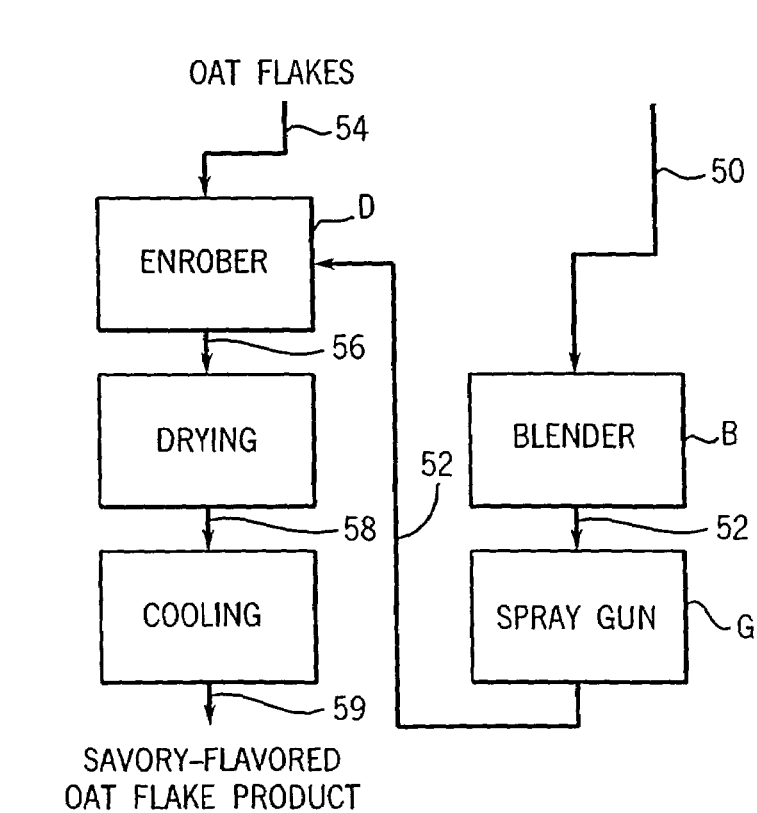
FIG. 4 is a flow chart illustrating a method of coating oat flakes with a butter and salt-flavored coating material in accordance with the invention.

FIG. 4 shows a method for producing a savory, bulk-packaged oat flake product having a butter and salt flavor. In this example, the coating material is prepared by blending ingredients, shown as stream 50, which include 7.5 grams of butter flavor, 15 grams of salt (optional), and 100 grams of water in a blender B. The coating material, stream 52, is applied with a spray gun G onto 1 kilogram of oat flakes, shown as stream 54, contained in a rotating drum D that is rotating at 17 RPM. The tumbling action of the oat flakes facilitates the distribution of the coating material so it becomes substantially uniformly distributed across the surface of the oat flakes. The coated oat flakes, shown as stream 56, are first dried to yield stream 58—i.e., dried, coated oat flakes having a desired moisture concentration. The dried, coated oat flakes are then cooled under the same conditions given in Example 2 above. The finished oat flake product, shown as stream 59, has a moisture concentration of about 10% to 13%.

The inventive method may be used to prepare oat flake products having a variety of flavors, such as vanilla, malt, peanut butter, and caramel nut, as examples.

EXAMPLE 4

Figure 5:
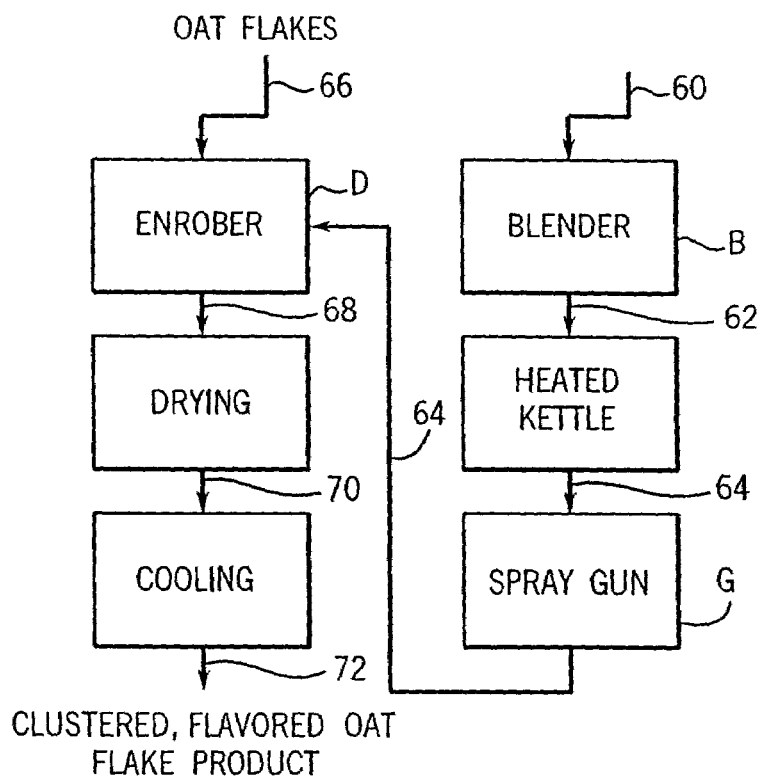
FIG. 5 is a flow chart illustrating a method of forming clustered, flavored oat flakes containing a vitamin/mineral premix, in accordance with the invention.

Shown in FIG. 5 is a method for producing a bulk-packaged, clustered oat flake product that has a maple, brown sugar flavor and is suitable for consumption in any one of three ways; i.e., as a ready-to-eat cereal, a hot cereal, or a snack. The coating material is prepared by blending 621 grams of liquid sugar, 18.5 grams of brown sugar, and 5.3 grams of maple flavor with 39.1 grams of a premix comprising salt, guar gum, vitamins and minerals, these ingredients being shown as stream 60. As with the previous examples, these ingredients are typically mixed in a blender B to yield a coating mixture, shown as stream 62. After coating mixture 62 is heated to about 140° F., the resulting coating material, shown as stream 64, is applied to 1 kilogram of oat flakes, shown as stream 66, contained in a drum D rotating at 17 RPM. A spray gun G, connected to an air line having 10 psi, is used to apply coating material, stream 64, at 5 psi to the oat flakes as they tumble in rotating drum D. The coated oat flakes, shown as stream 68, are spread to a depth of about 1 to 3 inches and dried at 270° F. for about 6 minutes. For 50% of the drying time, the oat flakes are subjected to an up/down air flow. The dried flakes, depicted as stream 70, are then cooled, as they are stirred, to a temperature of less than 110° F. The finished product, shown as stream 72, has a moisture concentration of about 4.9%.

Examples of other oat flake products that can be prepared via this method are brown sugar-cinnamon-flavored and coffee-flavored oat flakes, although the method can be used to apply essentially any type of flavor.

EXAMPLE 5

Figure 6:
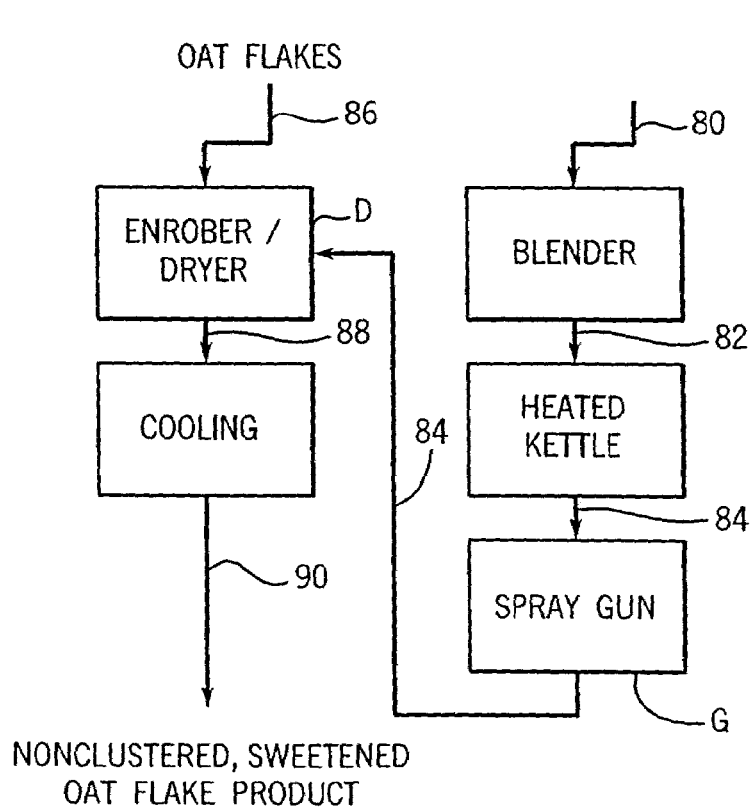
FIG. 6 is a flow chart illustrating a method of forming nonclustered, sweetened and flavored oat flakes in accordance with the invention.

FIG. 6 illustrates a method for producing nonclustered, sweetened and flavored oat flakes. In this embodiment of the invention, the method features concurrent coating and drying steps. The coating material is prepared by blending 4.13 kilograms of sugar with 3.0 kilograms of water, and adding from about 19.3 to about 32.1 grams of flavor and 213.4 grams of salt. The ingredients are shown as stream 80 in FIG. 6. The mixture, shown as stream 82, is heated to about 100–160° F., and more preferably 120° F., to promote dissolution of the solids and form the coating material, shown as stream 84. A spray gun G is used to dispense about 1.27 kilograms of the coating material, shown as stream 84, under 10 psi, onto 1.82 kilograms of oat flakes that are tumbling in a rotating drum D at a speed of 12 RPM. The oat flakes are shown as stream 86. The atomizing air for spray gun G is generally in the range of about 6-12 psi, and the coating step takes about 6 minutes. The coated flakes are dried at a temperature of about 270° F. for a sufficient amount of time to achieve drying. During coating and drying, the air flow is about 850 cfm. The dried oat flakes, shown as stream 88, are then cooled for about 2.5 minutes. Shown as stream 90, the finished product has a moisture concentration in the range of about 7.5%.

As described above, this embodiment of the invention can be used to prepare nonagglomerated oat flakes coated with a variety of flavors and sweeteners, such as brown sugar, cinnamon, or maple flavors, for example.

While the invention has been described with respect to certain preferred embodiments, it is to be understood that the invention is capable of numerous changes, modifications, and rearrangements without departing from the scope or spirit of the invention as defined in the claims.

What is claimed is:

1. A bulk packaged uncooked oat flake food product containing no grain other than oats comprising:
    grain composed only of a bulk quantity of individual, separate uncooked oat flakes, each of the uncooked oat flakes coated with a fat-free adherent coating that adheres to the surface of the uncooked oat flakes the coating composed of coating material comprising a binder selected from the group consisting of sugar, fructose, honey, corn syrup, fruit juice, hydrocolloids, maltodextrin, corn syrup solids, and mixtures thereof and an active ingredient different from the binder and uniformly dispersed within the binder selected from the group consisting of vitamins, colorants, sweeteners, flavors and natural nutrients selected from the group consisting of herbal extracts, ginseng, bee pollen and mixtures thereof; and
    a bulk container containing the bulk quantity of coated uncooked oat flakes wherein substantially none of the coating material settles to the bottom of the container.
2. The product of claim 1 wherein said coating material comprises from about 0.1% to about 60% by weight, on a dry weight basis of the coated, uncooked oat product.

3. The product of claim 1 wherein said coating material comprises from about 20% to about 50% by weight, on a dry weight basis of the coated, uncooked oat product.

4. The product of claim 1 wherein said coating material comprises from about 35% to about 45% by weight, on a dry weight basis of the coated, uncooked oat product.

5. The product of claim 1 wherein said vitamins are selected from the group consisting of derivatives of vitamin A, beta-carotene, thiamin, riboflavin, niacin, vitamin $B_6$, vitamin $B_{12}$, vitamin C, vitamin D, vitamin E, folic acid, and mixtures thereof.

6. The product of claim 1 wherein said natural nutrients are selected from the group consisting of Echinacea extract, gingko biloba extract, ginseng, bee pollen, St. John's wort extract, and mixtures thereof.

7. An uncooked, oat product containing no grain other than oats comprising:
    grain composed only of a bulk quantity of individual, separate uncooked oat flakes, each of the uncooked oat flakes coated with a fat-free adherent coating that adheres to the surface of the uncooked oat flakes, the coating composed of coating material comprising a binder selected from the group consisting of sugar, fructose, honey, corn syrup, fruit juice, hydrocolloids, maltodextrin, corn syrup solids, and mixtures thereof and an active ingredient different from the binder and uniformly dispersed within the binder selected from the group consisting of vitamins, colorants, sweeteners, flavors and natural nutrients selected from the group consisting of herbal extracts, ginseng, bee pollen and mixtures thereof; and
    the coating comprising at least one material selected from the group consisting of colorants, flavors, nutrients, and sweeteners.

8. The product of claim 7 wherein said coating material comprises from about 20% to about 60% by weight, on a dry weight basis of the coated, uncooked oat product.

9. The product of claim 7 wherein said coating material comprises from about 35% to about 45% by weight, on a dry weight basis of the coated, uncooked oat product.

10. The product of claim 7 wherein said vitamins are selected from the group consisting of derivatives of vitamin A, beta-carotene, thiamin, riboflavin, niacin, vitamin $B_6$, vitamin $B_{12}$, vitamin C, vitamin D, vitamin E, folic acid, and mixtures thereof.

11. The product of claim 7 wherein said natural nutrients are selected from the group consisting of Echinacea extract, gingko biloba extract, ginseng, bee pollen, St. John's wort extract, and mixtures thereof.

* * * * *